United States Patent [19]

Tamai et al.

[11] 4,379,803

[45] Apr. 12, 1983

[54] MAGNETIC RECORDING MEDIUM

[75] Inventors: Kiminori Tamai; Masashi Hayama, both of Tokyo, Japan

[73] Assignee: TDK Electronics Co., Ltd., Tokyo, Japan

[21] Appl. No.: 306,664

[22] Filed: Sep. 29, 1981

[30] Foreign Application Priority Data

Oct. 7, 1980 [JP] Japan .............................. 55/140192

[51] Int. Cl.³ .............................................. G11B 5/70
[52] U.S. Cl. .................... 428/328; 252/62.54; 360/134; 428/329; 428/331; 428/694; 428/900
[58] Field of Search ............... 427/128, 127; 252/518, 252/62.54; 428/694, 695, 900, 328, 329, 331; 360/134, 135, 136

[56] References Cited

U.S. PATENT DOCUMENTS 4,074,002 8/1978 Hack ................................. 428/694
4,092,459 5/1978 Deffeyes et al. ................... 428/900
4,285,825 8/1981 Isobe et al. ......................... 427/128
4,333,988 6/1952 Yamada et al. ................. 252/62.54

FOREIGN PATENT DOCUMENTS 54-147814 11/1979 Japan .................................. 428/900

OTHER PUBLICATIONS

Aronsson et al., Borides, Silicides and Phosphides, A Critical Review of Their Preparation, Properties and Crystal Chemistry, 1965, p. 39.

*Primary Examiner*—Stanley S. Silverman
*Attorney, Agent, or Firm*—Oblon, Fisher, Spivak, McClelland & Maier

[57] ABSTRACT

A magnetic recording medium having a substrate coated with a magnetic layer comprises a binder, a magnetic powder and a metal phosphide at a ratio of 0.2 to 5.0 wt. % based on said magnetic powder.

6 Claims, 3 Drawing Figures

MAGNETIC RECORDING MEDIUM

BACKGROUND OF THE INVENTION

1. Field of the Invention

The present invention relates to a magnetic recording medium having an antistatic property.

2. Description of the Prior Art

A magnetic recording medium such as a magnetic recording tape having high electrification easily adsorbs dust to cause a drop-out or a reduction of a reproducing output.

It has been considered to increase an electric conductivity of a magnetic layer by incorporating an additive such as various antistatic agents, carbon blacks and metallic powders in order to overcome the disadvantages. However, certain disadvantages have been found. For example, the incorporation of the antistatic agent causes a blooming or a plasticization of the magnetic layer. The incorporation of carbon black causes a reduction of a sensitivity and a deterioration of the magnetic layer. In the incorporation of the metallic powder, it is not effective if the metallic powder is not a fine powder. However, a fine metallic powder is remarkably active to cause an explosion. Therefore, the handling is not easy and the metallic powder is easily rusted and an electric resistance is highly changed in aging.

SUMMARY OF THE INVENTION

It is an object of the present invention to provide a magnetic recording medium having excellent antistatic property without a blooming of an antistatic agent, a plasticization of a magnetic layer, a reduction of a sensitivity, a deterioration of a magnetic layer, an explosion, a rusting and a change of an electric resistance in aging.

The foregoing and other objects of the present invention have been attained by providing a magnetic recording medium having a substrate coated with a magnetic layer which comprises a binder, a magnetic powder and a metal phosphide at a ratio of 0.2 to 5.0 wt.% based on said magnetic powder.

DETAILED DESCRIPTION OF THE PREFERRED EMBODIMENTS

Figure 1:
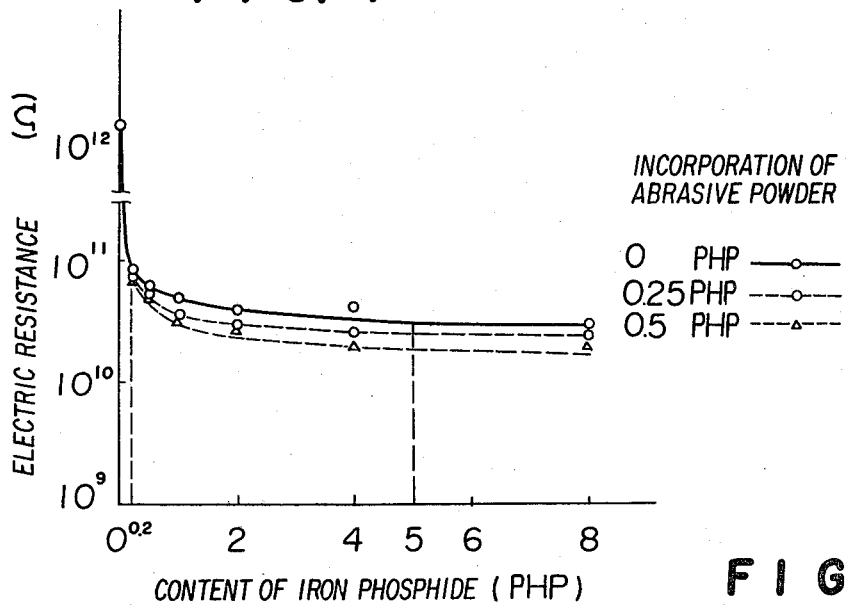
FIG. 1 is a graph showing an effect of a reduction of an electric resistance of a magnetic recording medium by an incorporation of iron phosphide and alumina.

The inventors have studied to overcome the disadvantages in the conventional proposals and how to reduce the electrification (electric charge caused by the friction) and have found that the incorporation of the metal phosphide in the magnetic powder composition is especially effective to impart an antistatic property.

As a scale of the electrification, an electric resistance is considered. An electric resistance of $10^9$–$10^{10}\Omega$ is considered to be necessary and to be enough in the case of a magnetic recording tape.

In accordance with the present invention, various disadvantages can be minimized by the incorporation of a metal phosphide at a ratio of 0.2 to 5.0 wt.% based on the magnetic powder in the magnetic powder composition. The electric resistance of the order of $10^{13}\Omega$ in the case of the non-addition can be reduced to the range of $10^9$–$10^{10}\Omega$ to be necessary and to be enough in the case of the magnetic recording tape.

The incorporation of the metal phosphide is effective for reducing electrification level. Thus, the effect is further improved by an incorporation of an abrasive having Mohs' scale of hardness of 6 or higher (chromium oxide, alumina, silicon carbide, titanium dioxide, silicon dioxide etc.) together with the metal phosphide. A content of the abrasive is limited to prevent a wearing of a magnetic head and is 0.5 wt.% of less based on the magnetic powder. When the abrasive is incorporated, a content of the metal phosphide can be reduced to reduce the electric resistance to be necessary and enough. It is also possible to incorporate the other antistatic agent or carbon black, a content of the metal phosphide can be reduced to reduce the electric resistance to be necessary and enough. When a particle size of the abrasive powder is less than 3 μm, the wearing of the magnetic head is increased, and a drop-out or a variation of the output are caused.

When a content of the metal phosphide is less than 0.2 wt.% based on the magnetic powder, the electric resistance is not substantially reduced. When it is more than 5.0 wt.%, a serious result of squareness ratio and a reducton of Hc are caused to give inferior characteristics of the magnetic recording tape. The trouble in the practical application is caused.

The metal phosphide is not rusted by the exposure in air, and accordingly, the increase of the electric resistance in aging is not substantially found though such increase of the electric resistance is caused in the case of the incorporation of the metallic powder.

The kinds of the magnetic powders, the binders, the solvents and the additives and the preparation of the magnetic layers and the conditions are well-known in this field and accordingly, they are not repeated in this specification.

The present invention will be illustrated by certain examples and references which are provided for purposes of illustration only and are not intended to be limiting the invention.

EXAMPLE

| | |
|---|---|
| γ-Fe$_2$O$_3$: | 100 wt. parts |
| Vinyl chloride-vinyl acetate copolymer: | 20 wt. parts |
| Acrylonitrile-butadiene rubber: | 5 wt. parts |
| Dispersing agent (lecithin): | 2 wt. parts |
| Solvent (methyl ethyl ketone: toluene): | 200 wt. parts |

Iron phosphide (mixture of FeP and Fe$_2$P: 20–28% as P) was incorporated at a ratio of 0 to 8 wt.% based on the magnetic powder and alumina (average particle diameter of 0.8 μm) as an abrasive powder was incorporated at a ratio of 0 to 0.5 wt.% based on the magnetic powder in the composition of the above-mentioned components. The mixtures were respectively dispersed for 2 hours.

Each resulting magnetic powder was coated on a polyester film and dried in a width of 6.3 mm. Each electric resistance for a length of 5 cm was measured.

FIG. 1 shows the variation of the electric resistances to variations of the contents of the iron phosphide and the abrasive powder (alumina).

When the content of the iron phosphide is 0.2 wt.% or more based on the magnetic powder, the electric resistances are lowered for 2.5 orders in comparison with those of the non-addition. When the abrasive powder is added, the electric resistances were further lowered. Thus, the electric resistance can be reduced by the incorporation of the metal phosphide and the abrasive powder.

Figure 2:
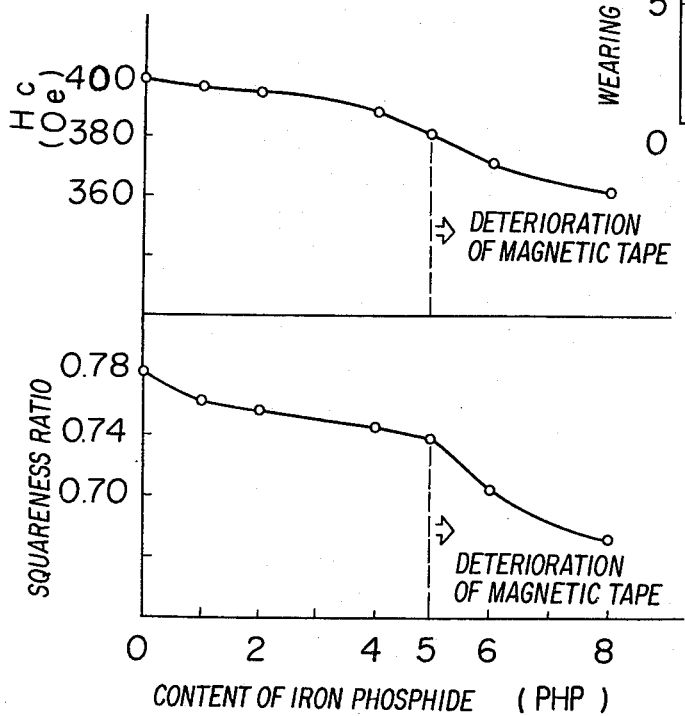
FIG. 2 is a graph showing variations of a coercive force Hc and a squareness ratio of a magnetic recording medium by an incorporation of iron phosphide and alumina.

FIG. 2 shows the magnetic characteristics in the cases of an incorporation of the iron phosphide at a ratio of 0 to 8 wt.% based on the magnetic powder.

When the content of the iron phosphide is 5.0 wt.% or less based on the magnetic powder, the deterioration of the magnetic characteristics can be minimized whereas the electric resistance can be reduced to be necessary and enough.

Figure 3:
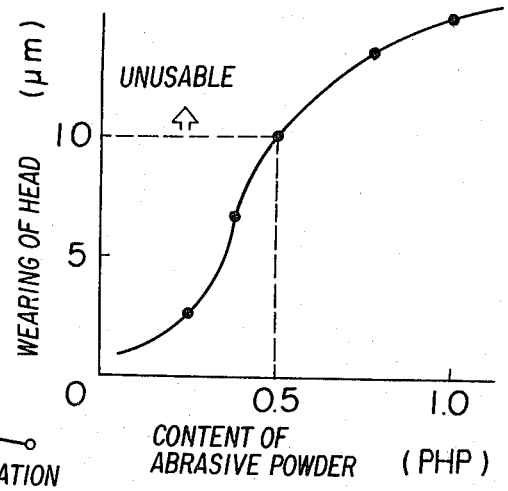
FIG. 3 is a graph showing a variation of wearing of a magnetic head by an incorporation of an abrasive powder (alumina) in the case of an incorporation of iron phosphide at a ratio of 1.0 wt.% based on the magnetic powder.

FIG. 3 shows the variation of the wearing of the magnetic head by the incorporation of the abrasive powder. When the content of the abrasive powder is 0.5 wt.% or less, the wearing of the magnetic head is not so serious.

As described, in accordance with the incorporation of the metal phosphide and the abrasive powder in the magnetic powder composition, the electric resistance can be effectively reduced and adverse effect caused by the charging can eliminated.

The same tests were carried out by using nickel phosphide and cobalt phosphide, instead of iron phosphide. The same effects were found.

We claim:

1. A magnetic recording medium, comprising:
a substrate coated with a magnetic layer, said magnetic layer comprising a synthetic binder, a magnetic powder and at least one Group VIII metal phosphide with the amount of said metal phosphide in said magnetic layer ranging from 0.2 to 5.0 wt. % based on said magnetic powder.

2. The magnetic recording medium of claim 1, wherein said magnetic layer further comprises a particulate abrasive.

3. The magnetic recording medium of claim 2, wherein said particulate abrasive has a Mohs' hardness of at least 6, an average particle size of no more than 3 $\mu$m, and is present in said layer in an amount of no more than 0.5 wt. % based on said magnetic powder.

4. The magnetic recording medium of claim 2, wherein said particulate abrasive is chromium oxide, alumina, silicon carbide, titanium dioxide or silicon dioxide.

5. The magnetic recording medium of claim 1, wherein said metal phosphide is nickel phosphide, cobalt phosphide or iron phosphide.

6. The magnetic recording medium of claim 1, wherein said magnetic powder is $\gamma$-$Fe_2O_3$.